US007194239B2

(12) United States Patent
Mäntyjärvi et al.

(10) Patent No.: US 7,194,239 B2
(45) Date of Patent: Mar. 20, 2007

(54) ELECTRONIC DEVICE AND METHOD FOR MANAGING ITS KEYBOARD

(75) Inventors: Jani Mäntyjärvi, Oulu (FI); Johan Himberg, Helsinki (FI)

(73) Assignee: Nokia Corporation, Espoo (FI)

( * ) Notice: Subject to any disclaimer, the term of this patent is extended or adjusted under 35 U.S.C. 154(b) by 560 days.

(21) Appl. No.: 10/459,742

(22) Filed: Jun. 12, 2003

(65) Prior Publication Data

US 2004/0009788 A1 Jan. 15, 2004

(30) Foreign Application Priority Data

Jun. 14, 2002 (FI) ................................. 20021162

(51) Int. Cl.
*H04B 7/00* (2006.01)

(52) U.S. Cl. ............... 455/66.1; 455/556.1; 455/556.2; 455/557; 455/563; 345/168; 400/489; 341/22

(58) Field of Classification Search ............ 455/556.1, 455/556.2, 557, 563; 345/168, 169, 173, 345/172; 341/22, 23; 400/489, 485
See application file for complete search history.

(56) References Cited

U.S. PATENT DOCUMENTS 5,128,672 A * 7/1992 Kaehler ........................ 341/23
5,479,536 A 12/1995 Comerford
5,828,323 A * 10/1998 Bartet ......................... 341/22
5,963,671 A 10/1999 Comerford et al.
5,984,502 A * 11/1999 Calder ......................... 700/83
6,097,374 A * 8/2000 Howard ...................... 345/168
6,172,625 B1 * 1/2001 Jin et al. ...................... 341/67
6,301,626 B1 10/2001 Knox
6,307,541 B1 * 10/2001 Ho et al. .................... 345/171
6,405,060 B1 * 6/2002 Schroeder et al. .......... 455/566
6,437,709 B1 * 8/2002 Hao ............................ 341/23
6,720,951 B2 * 4/2004 Taguchi ...................... 345/172
6,724,370 B2 * 4/2004 Dutta et al. ................. 345/169
6,789,967 B1 * 9/2004 Forester ...................... 400/489
6,847,311 B2 * 1/2005 Li ............................... 341/28
6,885,318 B2 * 4/2005 Bickerton .................... 341/22

FOREIGN PATENT DOCUMENTS

DE 100 12671 A1 9/2001
EP 0 967 542 A2 12/1999
EP 1 168 233 A2 1/2002
FR 2 806 491 9/2001

* cited by examiner

*Primary Examiner*—Marceau Milord
(74) *Attorney, Agent, or Firm*—Hollingsworth & Funk, LLC

(57) ABSTRACT

The invention relates to an electronic device and a method for managing the keyboard of the electronic device. The electronic device comprises a keyboard and a processing unit connected to the keyboard over a data transmission connection, the processing unit being configured to determine the appearance of the keyboard, receive information generated by pressing of a keyboard key and identify the key that was pressed on the basis of the information. The processing unit is also configured to collect information on the key presses and carry out an analysis of them, and to re-determine the appearance of the keyboard on the basis of the collected information and the analysis carried out so as to make the keyboard more ergonomic for the user, which makes the use of the keyboard easier and/or the pressing of a wrong key less likely.

24 Claims, 3 Drawing Sheets

1000 START
1002 DETERMINE KEYBOARD APPEARANCE
1004 RECEIVE INFORMATION
1006 IDENTIFY KEY THAT WAS PRESSED
1008 COLLECT INFORMATION
1010 CONDITION FULFILLED
NO
YES
1012 CARRY OUT ANALYSIS
1014 RE-DETERMINE KEYBOARD APPEARANCE TO MAKE IT MORE ERGONOMIC
1016 SWITCH-OFF
NO
YES
1018 END

ELECTRONIC DEVICE AND METHOD FOR MANAGING ITS KEYBOARD

FIELD

The invention relates to an electronic device and to a method for managing the keyboard of the electronic device.

BACKGROUND

Electronic devices, e.g. portable subscriber terminals of a mobile communication system, usually include a keyboard. As the devices are made smaller, the size of the keyboard can also be decreased. When pressing keyboard keys, the user may also press wrong keys. The small key size may increase the occurrences of wrong key presses. The dimensions of users' hands are different and the ways in which the keys are pressed also vary: some use the thumb whereas the others use the index finger. Thus the keyboard appearance is usually always a compromise; it suits an average user fine but has not been designed in accordance with the needs and routines of any individual user. As the use of different electronic devices provided with a keyboard is constantly becoming more common, there is a great need to enhance the ergonomics of keyboards.

BRIEF DESCRIPTION

The object of the invention is to provide an improved electronic device and an improved method for managing the keyboard of the electronic device.

One aspect of the invention relates to an electronic device, comprising a keyboard and a processing unit connected to the keyboard over a data transmission connection, the processing unit being configured to determine the appearance of the keyboard, receive information generated by pressing of a keyboard key and identify the key that was pressed on the basis of the information, the processing unit being further configured to collect information on the key presses and carry out an analysis of them, and re-determine the appearance of the keyboard on the basis of the collected information and the analysis carried out so as to make the keyboard more ergonomic for the user, which makes the use of the keyboard easier and/or the pressing of a wrong key less likely.

One aspect of the invention relates to a method for managing the keyboard of an electronic device, the method comprising: determining the appearance of the keyboard; receiving information generated by pressing of a keyboard key, and identifying the key that was pressed using the information; collecting information on the key presses and carrying out an analysis of them; and re-determining the appearance of the keyboard on the basis of the collected information and the analysis carried out so as to make the keyboard more ergonomic for the user, which makes the use of the keyboard easier and/or the pressing of a wrong key less likely.

The invention is based on the idea that the electronic device automatically analyzes how successfully the keyboard is used. On the basis of the analysis, the appearance of the keyboard is tailored to meet the user's needs and routines better.

The device and the method of the invention provide several advantages. A personal keyboard can be implemented for each user with relatively little computation. The usability of small keyboards, in particular, can be improved. The method described can also be utilized in the product development phase, where the keyboard appearance can be designed as ergonomic as possible for a large number of people on the basis of empirical tests carried out on the users.

LIST OF FIGURES

The invention will now be described in greater detail by means of preferred embodiments, with reference to the accompanying drawings, where FIGS. 1A and 1B illustrate examples of the appearance of an electronic device provided with a keyboard, FIGS. 2, 3, 4, and 5 illustrate tests carried out by the applicant;

DESCRIPTION OF THE EMBODIMENTS

An example of the appearance of a portable electronic device will be described with reference to FIG. 1A. The portable electronic device may be, for example, a portable device for ubiquitous data processing, such as a subscriber terminal of a radio system, e.g. mobile communication system, a PDA device (Personal Digital Assistant) or another device, e.g. an electronic measurement device where the user interface comprises a keyboard. The device may also combine different functions, i.e. it may be a combination of a subscriber terminal and a PDA device, for example. An example of this kind of combined device is the Nokia® Communicator®).

Figure 1A:
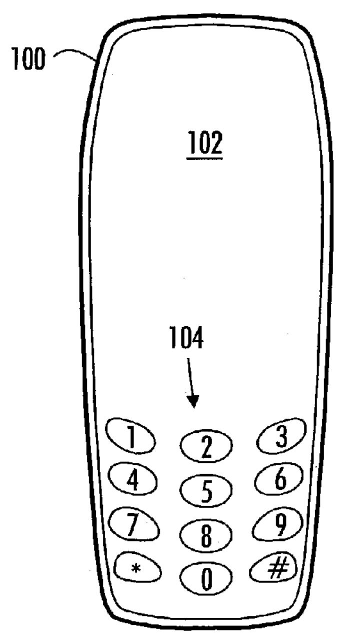

In the example of FIG. 1A, the device 100 is a subscriber terminal of a radio system, which is provided with a display 102. In FIG. 1A, the display 102 is a touch screen on which a keyboard 104 has been generated. In our example the keyboard comprises twelve keys, i.e. "1", "2", "3", "4", "5", "6", "7", "8", "9", "0", "*", and "#".

Figure 1B:
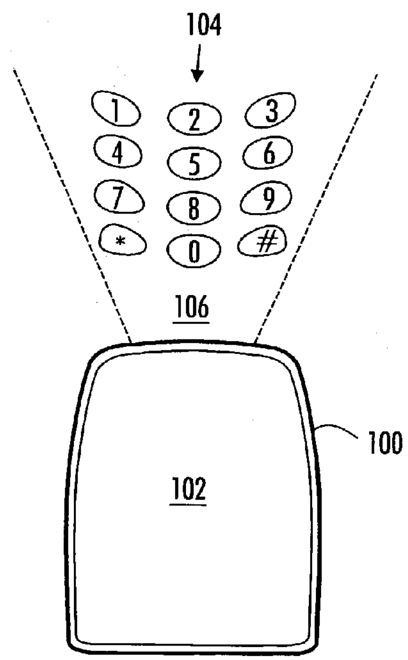
Figure 2:
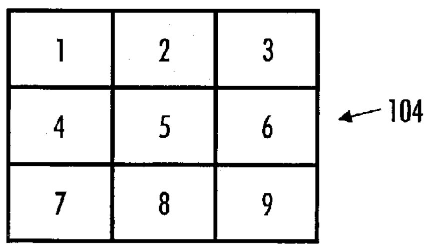

FIG. 1B describes a subscriber terminal 100 which comprises a display 102, but the keyboard 104 has been implemented in an unusual manner: it is projected from the device 100 next to it, e.g. onto the air or onto a surface, such as a table surface. The device 100 thus employs prior art for presenting the keyboard 104 and its keys as a projected image 106. The use of the projection technique is described in U.S. application Ser. No. 09/892,000, which is incorporated herein by reference.

Figure 6:
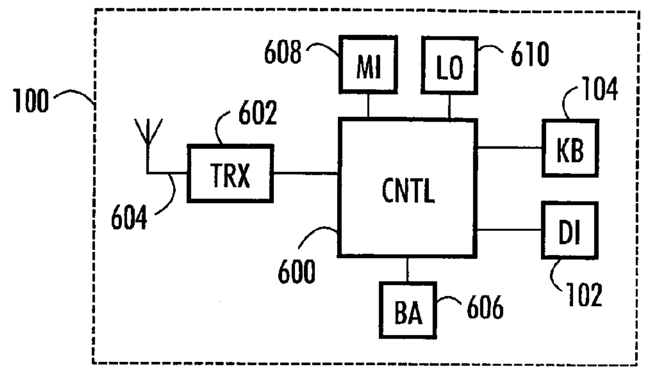
FIG. 6 is a simplified block diagram of the structure of an electronic device.

Next, the structure of the electronic device will be described with reference to FIG. 6. Since we use a subscriber terminal as an example, the device 100 comprises an antenna 604 and a radio transceiver 602. The radio transceiver 602 is e.g. a prior art transceiver of a mobile station which functions in the GSM system (Global System for Mobile Communications), GPRS system (General Packet Radio Service) or in the UMTS system (Universal Mobile Telecommunications System), for instance. In addition to the above-mentioned keyboard 104 and display 102 for implementing the user interface, a typical device 100 comprises a microphone 608 and a loudspeaker 610 for processing sound. A chargeable battery 606 usually functions as the power source.

The device 100 further comprises a processing unit 600, which controls and monitors the operation of the device and its various parts. The processing unit 600 also includes the application programs of the device 100, e.g. for radio signal processing and user interface management. Nowadays the processing unit 600 is usually implemented as a processor and its software but various hardware solutions are also feasible, such as a circuit built from separate logic components or one or more application-specific integrated circuits (ASIC). If necessary, there may be more than one processor. A hybrid of these solutions is also feasible. In the selection of the implementation method a person skilled in the art will naturally consider the requirements set on the size and power consumption of the device, the necessary processing capacity, production costs and production volumes.

An electronic device 100 comprising a keyboard 104 and a processing unit 600 connected to the keyboard 104 over a data transmission connection was described above. The processing unit 600 is configured to determine the appearance of the keyboard 104 because the keyboard shown in FIGS. 1A and 1B is in a way artificial, i.e. it is not similar to the typical mechanical keyboard. The keyboard 104 can be implemented using a touch screen or the projection technique but also other prior art methods of implementing an artificial keyboard can be applied.

To manage the keyboard 104, the processing unit 600 is configured to receive information generated by the pressing of a keyboard 104 key and to identify the key that was pressed on the basis of the information. A touch screen usually gives information on the point where the screen was pressed, e.g. as x and y coordinates, and also on the force by which the key was pressed. Other keyboard 104 control data may also be transmitted to the processing unit 600. Information on the use of the keyboard 104 implemented by the projection technique necessary for identifying a key press is also transmitted to the processing unit 600, e.g. finger movements in a three-dimensional space as x, y, and z coordinates.

The processing unit 600 is further configured to collect the above-mentioned information on the key presses and to carry out an analysis of them. The analysis is used to generate at least one of the following results: coordinates of an accepted key press, coordinates of a rejected key press, coordinates of a corrected key press, time used for successive key presses, mean of the coordinates of the presses of one key, variance of the coordinates of the presses of one key, statistical variable describing the presses of one key. The coordinates may refer to coordinates that define the pressed point with a desired accuracy, e.g. the centre point of a press or the touched area defined by the borderlines of a press. The statistical variable refers to other feasible ways of determining statistics for a key press, e.g. the median or the average size of the touched area, expressed as the width and height or the radius. The touched area can also be defined as an elliptical area where the touched area is defined by the centre point and main axes of the ellipse. The processing unit 600 can be configured to identify a press at the border of two keys or outside the keyboard 104 as a rejected key press. In addition, the processing unit 600 may be configured to identify the following sequence as a corrected key press: the first key press is deleted by the delete key, after which another key is pressed.

Then, on the basis of the collected information and the analysis carried out, the processing unit 600 re-determines the appearance of the keyboard 104 so as to make the keyboard 104 more ergonomic for the user, which makes the use of the keyboard 104 easier and/or the pressing of a wrong key less likely. The keyboard 104 appearance comprises at least one of the following: key size, key shape and key location. The key shape can also be defined as the key position; for example, if the key is implemented as an ellipse, the key position is determined as the directions of the ellipse's main axes. Thus the key shape can be adjusted by rotating the ellipse that defines it. Depending on the physical dimensions of the device 100, or, when the projection technique is used, on the maximum size of the projected image 106, the processing unit is configured to define limits for the keyboard 104 appearance that it cannot exceed.

Figure 8:
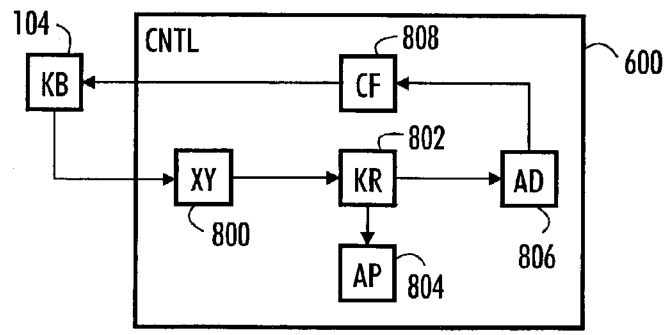
FIG. 8 illustrates the structure of a processing unit of the electronic device.

FIG. 8 illustrates a feasible structure of the processing unit 600. The blocks belonging to the processing unit 600 are structural entities that can be implemented e.g. as program modules, i.e. by a programming language, such as the C programming language, C++ programming language, computer language, or by an assembler, which are stored as runnable versions in a memory provided in the processor and run on the processor. Instead of translatable programming languages, other interpretable programming languages may naturally also be used, provided that they satisfy the required processing rate and capacity. When the processing unit 600 is implemented as an ASIC, the structural entities are ASIC blocks. Information is transmitted from the keyboard 104 to the processing unit 600. If the information is not in the form of x and y coordinates, it can be converted into this form by block 800. Block 800 may naturally also be provided in connection with the keyboard 104, e.g. in connection with the touch screen 102 when the touch screen technique is used. The processed information, which is presented e.g. as x and y coordinates, is then supplied to block 802, where the pressed key is identified. The information on the identified key is supplied to the application 804 that needs this information. The information on the identified key is also supplied to block 806, which collects information and carries out an analysis on the basis of which the appearance of the keyboard 104 is changed. The definitions of the new keyboard 104 appearance are then supplied from block 806 to block 808, which controls the determination of the keyboard 104 appearance. The whole block 808 or part of it may be located in connection with the keyboard 104, e.g. in connection with the touch screen 102 when the touch screen technology is employed.

There are several alternatives for changing the shape of a single key; for example, the key shape is changed in the main directions, i.e. in the x and y directions, or the key shape is changed arbitrarily, i.e. the key is shaped to correspond best to the manner of pressing the key, or the predetermined appearance of the key (e.g. preliminary shape and location of the key) is changed adaptively within the set limits. The processing unit 600 may be configured to move the centre point of a key according to the mean of the coordinates of key presses. The processing unit may be configured to change the key shape according to the variance of the coordinates of key presses. Some ways of changing the key shape will be discussed in greater detail below but at least the following clustering techniques can be used for changing the key shape: vector quantization VQ and expectation maximization EM.

In the following, tests carried out by the applicant on the new adaptive keyboard 104 will be described with reference to FIGS. 2, 3, 4 and 5. A portable computer provided with a touch screen was used in the test. A keyboard 104 illustrated in FIG. 2 was created both on the left and on the right side of the touch screen. Thus the keyboard appearance consisted of adjacent rectangular keys: "1", "2", "3", "4", "5", "6", "7", "8", and "9". The keyboard 104 on the left side of the touch screen was used to simulate a situation where the user of the subscriber terminal 100 presses the keys with his left-hand thumb, and the keyboard 104 on the right side was correspondingly used to simulate a situation where the user of the subscriber terminal 100 presses the keys with his right-hand thumb.

Figure 3:
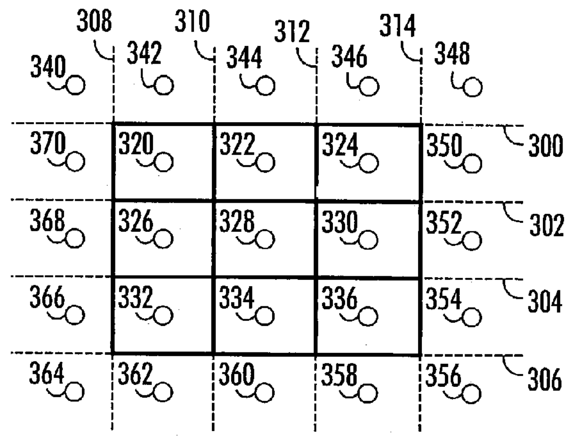

Each key "1" to "9" was parameterized as shown in FIG. 3 by using its centre point 320, 322, 324, 326, 328, 330, 334, 336. The borderlines 300, 302, 304, 306, 308, 310, 312, 314 between the keys were defined implicitly using the Voronoi regions of the centre points known from vector quantization. For example, the Voronoi region of key "1" is the rectangular area which is defined by borderlines 300, 302, 308 and 319 and is closer to the centre point 320 of key "1" than to any other centre point. Principles of vector quantization and computing of Voronoi regions are described in Allen Gersho & Robert M. Gray: Vector Quantization and Signal Compression, The Kluwer International Series in Engineering and Computer Science, 1992, which is incorporated herein by reference. In addition to the nine adaptive centre points 320, 322, 324, 326, 328, 330, 332, 334, 336 of the keys, sixteen fixed centre points 340, 342, 344, 346, 348, 350, 352, 354, 356, 358, 360, 363, 364, 366, 368, 370 were determined. These were associated with the value 'nil' or with the keyboard 104 border. The Voronoi regions of these fixed centre points were defined as regions outside the keyboard 104 border.

Then the actual test started. The test was carried out first on the keyboard 104 on the left side and then on the keyboard on the right side. A sequence consisting of four random numbers R1, R2, R3, R4 was shown to the user (on the touch screen). The random numbers were selected from 1 to 9. The user tried to key in these numbers using the keyboard 104 to be tested with his respective thumb. The feeding thus took place by pressing the keyboard 104 key in question, i.e. the Voronoi region of the code book vector associated with the key concerned.

The real coordinates P1=(x1, y1), P2=(x2, y2), P3=(x3, y3) and P4=(x4, y4) of each key press were saved. Each press Pi was associated with the index (i.e. key "1" to "9") of the code book vector C(1) to C(9) that was closest to the press. Thus we obtained an input sequence of I1, I2, I3, I4.

If Ii was the same as number Ri, the press Pi coordinates (xi, yi) were saved in the set L(Ri) of accepted key presses for the key C(Ri) in question. If Ii was associated with a key different from number Ri, it was rejected.

After an adequate sample of key presses had been collected, e.g. hundred sequences consisting of four numbers, new code book vectors C(1) to C(9) were calculated for keys "1" to "9". The new code book vector was determined as the mean of the coordinates of the key in question in the set L(1)–L(9) of the coordinates of the presses of this key. After this, a keyboard 104 whose appearance had been re-determined to make it more ergonomic for the keyboard 104 user was shown to the user.

Figure 4:
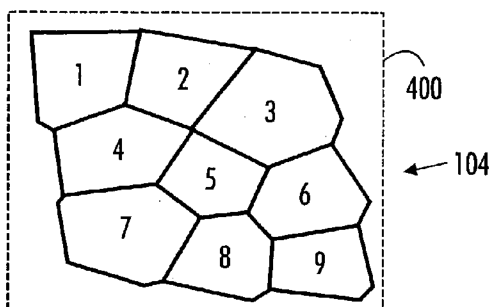
Figure 5:
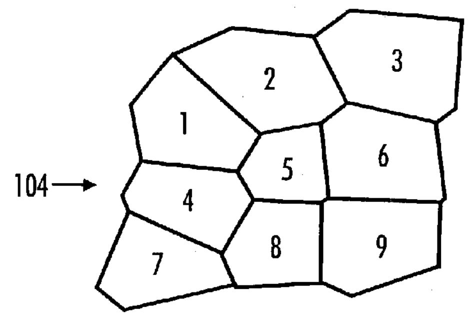

FIG. 4 shows the appearance of the keyboard 104 redetermined for the left-hand thumb, and FIG. 5 shows the appearance of the keyboard 104 re-determined for the right-hand thumb. In FIG. 4, the area 400 marked with dash lines describes the fact that limits (e.g. the maximum size) can be defined for the appearance of the keyboard 104 which the keyboard 104 appearance cannot exceed. The appearances of the keyboards 104 are symmetrical to each other to some extent, and thus it can be assumed that it has been determined ergonomically to support the function of the testee's thumbs.

Figure 7A:
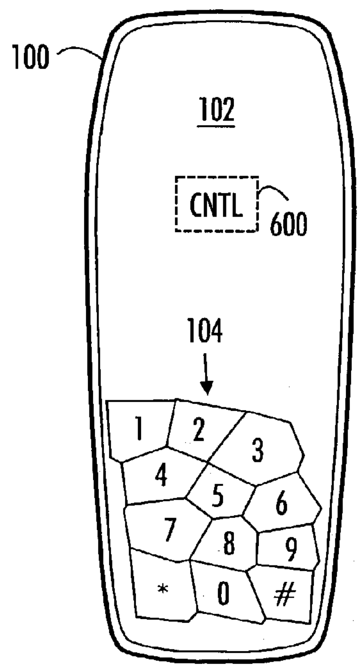
FIGS. 7A and 7B illustrate the devices of FIGS. 1A and 1B after the appearance of their keyboard has been made more ergonomic.
Figure 7B:
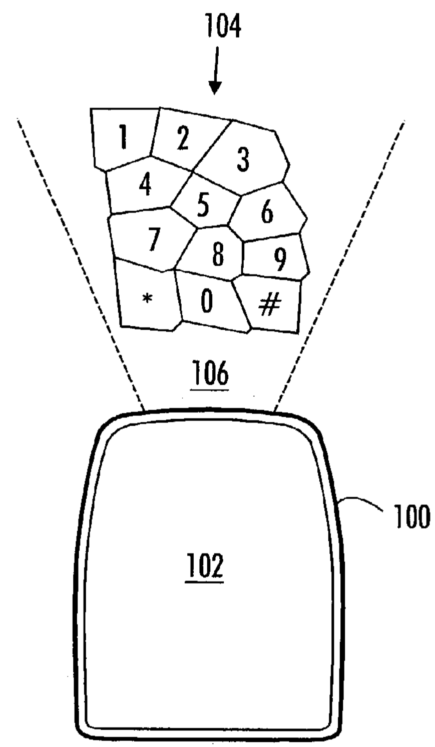

FIGS. 7A and 7B illustrate what the keyboard of the subscriber terminals 100 shown in FIGS. 1A and 1B could look like after its appearance has been made more ergonomic using the present method. The appearance of keys "*", "0" and "#" is an estimate, but that of the other keys is based on the test described above. If the electronic device 100 is used by more than one person, the device may comprise an alternative for each person. Thus the device 100 can determine, employing the method described, a separate keyboard 104 for each user that best suits his ergonomics. The present method can also be used in the product development phase, in which case the keyboard 104 appearance can be designed as ergonomic as possible for a large number of people on the basis of the tests described above. In that case the keyboard 104 can also be implemented as a fixed electromechanical keyboard.

Figure 9:
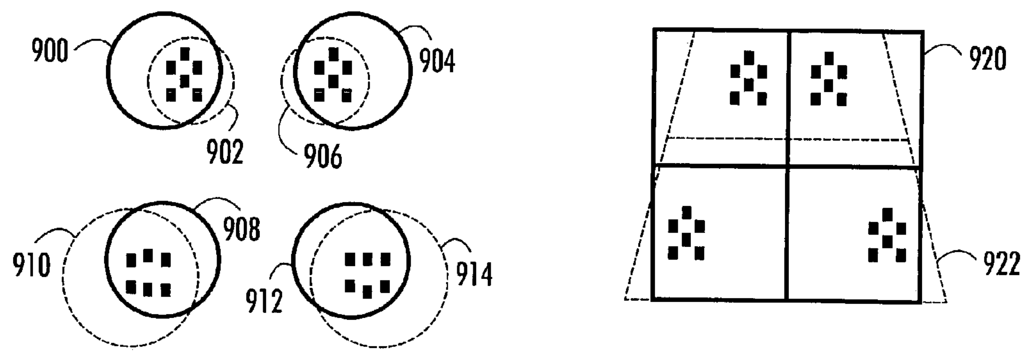
FIG. 9 illustrates some principles according to which the keyboard appearance can be re-determined.

FIG. 9 illustrates some principles according to which the keyboard 104 appearance can be re-determined. On the left side of FIG. 9 there are four keys 900, 904, 908, 912. The points describe the coordinates of key presses. The dash line denotes the location and size of new keys 902, 906, 910, 914. As can be seen, the location of the keys has been changed so that the centre point of the key corresponds better to the centre point of the presses. The size of the keys has been changed considering the variance of key presses. In this example, a condition has been set on the appearance of the keys: the key has to be circular. The variance of the presses of the upper keys 900, 904 is smaller than the variance of the presses of the lower keys 908, 912, and thus the size of the new upper keys 902, 906 has been reduced from their original size, whereas the size of the new lower keys 910, 914 has been increased from their original size. The right side of FIG. 9 illustrates one way of implementing vector quantization where key presses denoted by dots are considered data clusters. The appearance of the original keyboard 920 consisting of four rectangles has been changed, using vector quantization, into new kind of keyboard 922 consisting of four areas which are no longer rectangles.

Figure 10:
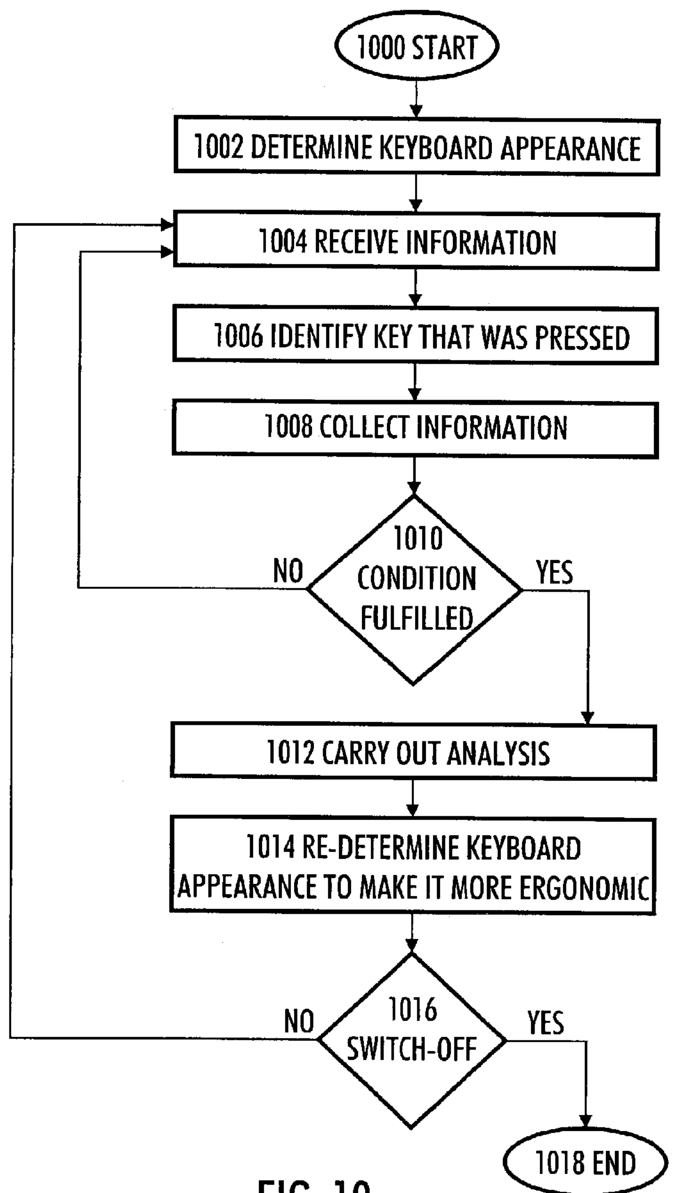
FIG. 10 is a flow chart illustrating a method of managing the keyboard of the electronic device.

In the following, a method of managing the keyboard of an electronic device will be described with reference to FIG. 10. The method starts in 1000, e.g. when the device is switched on. Then the keyboard appearance is determined in 1002. After the keyboard has been determined, the user may start using it. When the user uses the keyboard, information generated by pressing of the keyboard keys is received in 1004 and in 1006 the key that was pressed is identified on the basis of the information. Then we proceed to 1008, where information is collected on the use of the keyboard. The information comprises at least one of the following: key press coordinates, keyboard control data, and force of the key press.

According to the method, the keyboard appearance is not necessarily re-determined constantly but e.g. at certain intervals, when the device recognizes a new user, or when the user makes a selection according to which the device re-determines the appearance. The method may comprise testing, in accordance with 1010, whether a condition for re-determining the keyboard appearance is fulfilled. If the condition is not fulfilled in 1010, we move to 1004, otherwise to 1012, where the key presses are analyzed.

The analysis is used to generate at least one of the following results: coordinates of an accepted key press, coordinates of a rejected key press, coordinates of a corrected key press, time used for successive key presses, mean of the coordinates of the presses of one key, variance of the coordinates of the presses of one key. A key press at the border of two keys or a key press outside the keyboard can be identified as a rejected press. A sequence where the press of the first key is deleted by the delete key, after which another key is pressed, can be identified as a corrected key press.

Naturally, the function of 1008 is not performed if one does not want to re-determine the keyboard appearance. If, however, one wants to determine the appearance, the keyboard appearance is re-determined in 1014 on the basis of the collected information and the analysis carried out so as to make the keyboard more ergonomic for the user, which makes the use of the keyboard easier and the pressing of a wrong key less likely. The keyboard appearance comprises at least one of the following: key size, key shape and key location. Limits which the keyboard appearance may not exceed can be defined. The key shape may be changed in the main directions as described above, the key shape may be changed arbitrarily, the key centre point may be moved according to the mean of the coordinates of key presses, the key shape may be changed according to the variance of the coordinates of key presses, or the key shape is changed using vector quantization, expectation maximization or clustering.

Switching off of the device can be tested in block 1016. If the device is switched off, we move to 1018, where the keyboard determined can be saved for the user in question, and thus the method ends. If the device is not switched off, we move from 1018 to 1004. Naturally, 1016 may be located at other points of the method sequence. A device 100 described above is suitable for performing the method but also other devices where the keyboard shape can be changed may be applicable. The method can be employed e.g. in the product development phase, in which case a conventional electromechanical keyboard can be made more ergonomic.

Even though the invention was described with reference to an example according to the accompanying drawings, it is clear that the invention is not restricted thereto but it may be modified in various ways within the inventive concept disclosed in the enclosed claims.

We claim:

1. An electronic device comprising a keyboard and a processing unit connected to the keyboard over a data transmission connection, the processing unit being configured to determine the appearance of the keyboard, receive information generated by pressing of a keyboard key including the point of press on a key and identify the key that was pressed on the basis of the information, the processing unit is further configured to collect information on the key presses including the point of press on a key and carry out an analysis of them, and re-determine the appearance of the keyboard on the basis of the collected information including the point of press on a key and the analysis carried out so as to make the keyboard more ergonomic for the user, which makes it easier to use the keyboard and/or the pressing of a wrong key less likely.

2. A device according to claim 1, wherein the information comprises at least one of the following: key press coordinates, keyboard control data and force of the key press.

3. A device according to claim 1, wherein the analysis is used to generate at least one of the following results: coordinates of an acceptable key press, coordinates of a rejected key press, coordinates of a corrected key press, time used for successive key presses, mean of the coordinates of presses of one key, variance of the presses of one key, statistical variable describing the presses of one key.

4. A device according to claim 3, wherein the processing unit is configured to identify a press at the border of two keys or outside the keyboard as a rejected key press.

5. A device according to claim 3, wherein the processing unit is configured to identify the following sequence as a corrected key press: the first key press is deleted by the delete key, after which another key is pressed.

6. A device according to claim 1, wherein the appearance comprises at least one of the following: key size, key shape, key location.

7. A device according to claim 6, wherein the processing unit is configured to define limits for the keyboard appearance which the keyboard appearance cannot exceed.

8. A device according to claim 6, wherein the processing unit is configured to change the key shape in the main directions.

9. A device according to claim 6, wherein the processing unit is configured to change the key shape arbitrarily.

10. A device according to claim 6, wherein the processing unit is configured to move the key centre point according to the mean of the coordinates of key presses.

11. A device according to claim 6, wherein the processing unit is configured to change the key shape according to the variance of the coordinates of key presses.

12. A device according to claim 6, wherein the processing unit is configured to changed the key shape using vector quantization, expectation maximization or clustering.

13. A method for managing a keyboard of an electronic device, the method comprising:

determining the keyboard appearance;

receiving information generated by pressing of a keyboard key including the point of press on a key and identifying the key pressed on the basis of the information;

collecting information on the key presses icluding the point of press on a key and carrying out an analysis of them; and re-determining the appearance of the keyboard on the basis of the collected information including the point of press on a key and the analysis carried out so as to make the keyboard more ergonomic for the user, which makes the use of the keyboard easier and/or the pressing of a wrong key less likely.

14. A method according to claim 13, wherein the information comprises at least one of the following: key press coordinates, keyboard control data and force of the key press.

15. A method according to claim 13, wherein the analysis is used to generate at least one of the following results: coordinates of an accepted key press, coordinates of a rejected key press, coordinates of a corrected key press, time used for successive key presses, mean of the coordinates of the presses of one key, variance of the presses of one key, statistical variable describing the presses of one key.

16. A method according to claim 15, further comprising: identifying a press at the border of two keys or outside the keyboard as a rejected key press.

17. A method according to claim 15, further comprising: identifying the following sequence as a corrected key press: the first key press is deleted by the delete key, after which another key is pressed.

18. A method according to claim 13, wherein the appearance comprises at least one of the following: key size, key shape, key location.

19. A method according to claim 18, wherein limits are defined for the keyboard appearance that the keyboard appearance cannot exceed.

20. A method according to claim 18, wherein the key shape is changed in the main directions.

21. A method according to claim 18, wherein the key shape is changed arbitrarily.

22. A method according to claim 18, wherein the key centre point is moved according to the mean of the coordinates of key presses.

23. A method according to claim 18, wherein the key shape is changed according to the variance of the coordinates of key presses.

24. A method according to claim 18, wherein the key shape is changed using vector quantization, expectation maximization or clustering.

* * * * *